(12) United States Patent
Schwarzbich

(10) Patent No.: US 9,814,318 B2
(45) Date of Patent: Nov. 14, 2017

(54) LORDOSIS SUPPORT

(71) Applicant: Jörg Schwarzbich, Bielefeld (DE)

(72) Inventor: Jörg Schwarzbich, Bielefeld (DE)

( * ) Notice: Subject to any disclaimer, the term of this patent is extended or adjusted under 35 U.S.C. 154(b) by 72 days.

(21) Appl. No.: 14/708,339

(22) Filed: May 11, 2015

(65) Prior Publication Data

US 2015/0335161 A1 Nov. 26, 2015

(30) Foreign Application Priority Data

May 20, 2014 (DE) .................... 20 2014 102 360 U

(51) Int. Cl.
*A47C 7/46* (2006.01)
*B60N 2/66* (2006.01)

(52) U.S. Cl.
CPC .............. *A47C 7/46* (2013.01); *A47C 7/465* (2013.01); *B60N 2/66* (2013.01); *B60N 2/667* (2015.04)

(58) Field of Classification Search
CPC ........... A47C 7/46; A47C 7/462; A47C 7/465; B60N 2/667; B60N 2/6671; B60N 2/66; B60N 2/4415
See application file for complete search history.

(56) References Cited

U.S. PATENT DOCUMENTS

| | | | |
|---|---|---|---|
| 5,954,399 A * | 9/1999 | Hong | B60N 2/667 297/284.4 |
| 6,056,360 A * | 5/2000 | Schneider | B60N 2/66 297/284.4 |
| 7,425,036 B2 | 9/2008 | McMillen | |
| 7,874,616 B2 * | 1/2011 | D'Agostini | B60N 2/4228 297/216.12 |
| 2004/0108760 A1 * | 6/2004 | McMillen | B60N 2/6671 297/284.4 |
| 2006/0261653 A1 * | 11/2006 | McMillen | B60N 2/66 297/284.4 |
| 2007/0063561 A1 * | 3/2007 | McMillen | B60N 2/6671 297/284.8 |
| 2008/0217978 A1 * | 9/2008 | Stossel | B60N 2/66 297/284.4 |
| 2008/0264425 A1 * | 10/2008 | Mundell | A47C 7/465 128/845 |

FOREIGN PATENT DOCUMENTS

| | | |
|---|---|---|
| DE | 4492573 B4 | 11/2006 |
| DE | 102006012618 A1 | 9/2007 |
| DE | 102007006013 A1 | 8/2008 |
| DE | 202009000625 U1 | 4/2010 |
| DE | 102011083083 A1 | 3/2012 |
| EP | 0915773 B1 | 8/1997 |
| EP | 1910127 B1 | 8/2006 |
| EP | 2050617 A1 | 10/2007 |
| WO | 95/17840 A1 | 7/1995 |

* cited by examiner

*Primary Examiner* — Charles A Fox
*Assistant Examiner* — Christopher E Veraa
(74) *Attorney, Agent, or Firm* — Richard M. Goldberg

(57) ABSTRACT

A lordosis support for seat back rests, includes a support plate (10) held between two frame legs (14) of the back rest by tension members (12) and having on each side at least one point of attack (22) for the respective tension member (12), and an adjusting device (24) for adjusting the tension force of the tension members (12), wherein the distance between the two points of attack (22) is adjustable and the adjusting device (24) is configured to change this distance.

4 Claims, 3 Drawing Sheets

LORDOSIS SUPPORT

BACKGROUND OF THE INVENTION

The invention relates to a lordosis support for a seat back rest, comprising a support plate that is held between two frame legs of the seat back by means of at least two tension members and has on each side at least one point of attack for the respective tension member, and an adjusting device for adjusting a tension force of the tension members.

Lordosis supports of this type are provided for example in the seat backs of automotive vehicle seats and serve to support the spine of the user in the region of the lumbar verte-brae so as to achieve a healthy seat posture. The force that the user exerts on the support plate has the effect that the support plate is pushed back and reaches a position in which it is offset rearwardly relative to the plane of the frame legs. When, now, the tension force of the tension members is increased by means of the adjusting device, the support plate is drawn closer to the plane of the frame legs, so that it is less compliant to the force of the user and, correspondingly, provides a stronger support action.

In known lordosis supports of this type, the tension force of the tension members is increased by reducing the effective length of the tension members.

For example, EP 1 190 127 B1 describes a lordosis support of the type indicated above, wherein the tension members are configured as flexible cables that are deflected, ap-proximately in the center of the support plate, in a direction in parallel with the frame legs. The ends of these cables are connected to a common connector that can be displaced in the direction in parallel with the frame legs by means of the adjusting device, whereby the effective length of the cables is changed.

SUMMARY OF THE INVENTION

It is an object of the invention to provide a lordosis support wherein the supporting force can be adjusted more easily.

In order to achieve this object, according to the invention, the distance between the points of attack is adjustable, and the adjusting device is configured for changing this distance.

When the tension members are held under tension and, consequently, are straight, the two tension members form the slanting sides of a trapezoid, the smaller base side of which is formed by the line that interconnects the two points of attack. When, now, the distance between the points of attack is reduced by means of the adjusting device, i.e. the connecting line between these points is shortened, the distance from the frame leg, which distance must be spanned by the tension member, is increased accordingly. If the length of the tension members has not changed, then this increased distance can only be compensated by the tension members assuming a straightened posture in which they form a smaller angle with the support plate, so that the support plate is brought closer to the plane that is defined by the frame legs.

In another embodiment, however, it is also possible that the length of the tension members themselves is variable. For example, the two tension members may be formed by a continuous cable that passes from one frame leg via the two points of attack of the support plate to the opposite frame leg and is not fixed at the points of attack but is only deflected there. Then, when the distance between the points of attack is reduced, the length of the tension members increases because the total length of the cable remains constant. In this case, the larger length of the tension members in relation to the connecting line between the points of attack permits the support plate to be displaced further away from the frame legs, so that the lordosis support becomes more compliant.

In both cases it is an advantage that the relative movement of the points of attack that is reduced by the adjusting device is a movement in a direction at right angles to the frame legs. If the adjusting device is arranged laterally at one side of the seat back, as is common for reasons of easy access and operability, then the adjusting device may consequently be configured such that it draws the points of attack apart or forces them closer together, and it is not necessary to redirect the force of the adjusting device into another direction. This permits to reduce the frictional resistance and thus permits an easier op-eration of the adjusting device. Moreover, the invention permits to considerably sim-plify the manufacturing process for the lordosis support.

BRIEF DESCRIPTION OF THE DRAWINGS

Useful details and further developments of the invention are indicated in the dependent claims.

Embodiment examples will more described in conjunction with drawings, wherein.

DETAILED DESCRIPTION

Figure 1:
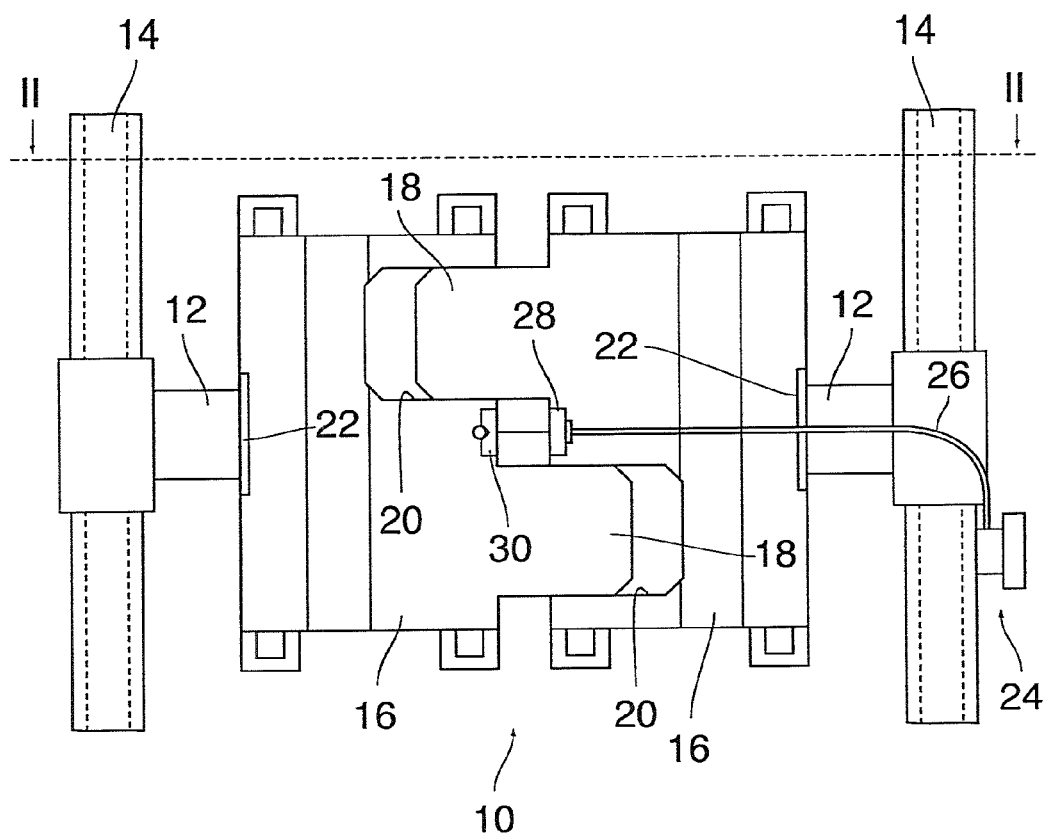
FIG. 1 is a schematic view of a lordosis support between two frame legs of a seat back rest.

The lordosis support shown in FIG. 1 has a support plate 10 that is held between two parallel frame legs 14 of seat back rest by means of two tension members 12 in the form of flexible bands. The support plate 10 has been formed for example by plastic injection molding and is composed of two half-plates 16 which have identical shapes and are displaceably held in engagement with one another in positions rotated by 180° relative to one another. To that end, each half-plate has a projecting tongue 18 that is displaceably guided in a complementary duct 20 of the respective other half-plate.

At the edges facing away from one another, each of the half-plates 16 has a respective point of attack 22 for the associated tension member 12. This point of attack 22 is formed for example by a slot-like structure in which a corresponding bulge of the tension member 12 is anchored in a form-fitting manner.

On one side of the seat back rest, at the right frame leg 14 in this example, a known adjusting device 24 for adjusting the lordosis support has been arranged. The adjusting device has a Bowden cable 26 the outer cable of which is supported at a counter bearing 28 of the one half-plate 16 whereas the inner wire is anchored at a counter bearing 30 of the other half-plate.

Figure 2:
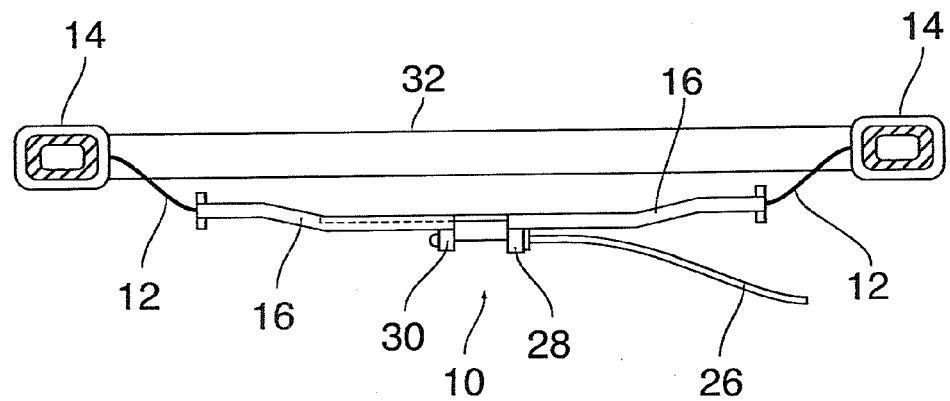
FIG. 2 is a section along the line II-II in FIG. 1.

When the back of the user exerts a force onto the support plate 10 via the cushioning of the seat back which has not been shown here, the flexibility of the tension members 12 permits the support plate to yield to some extent, as has been shown in FIG. 2. The prin-cipal plane of the support plate 10 is therefore slightly offset (downwardly in FIG. 2) relative to the plane that is defined by the frame legs 14. The tension members 12 are tensioned and therefore have the tendency to draw the two half-plates 16 of the support plate apart. This separating movement is however inhibited by the Bowden cable 26, so that the support plate 10 may not yield further and, consequently, exerts a support action onto the back of the user.

Since, in this example, the support plate 10 is subject only to tensional forces that have the tendency to draw the two half-plates apart, all that is required of the adjusting device 24 and the Bowden cable 26 is to be configured such that these tension forces can be absorbed. Consequently, the inner wire of the Bowden cable 26 needs not translate any thrust forces in this embodiment.

Figure 3:
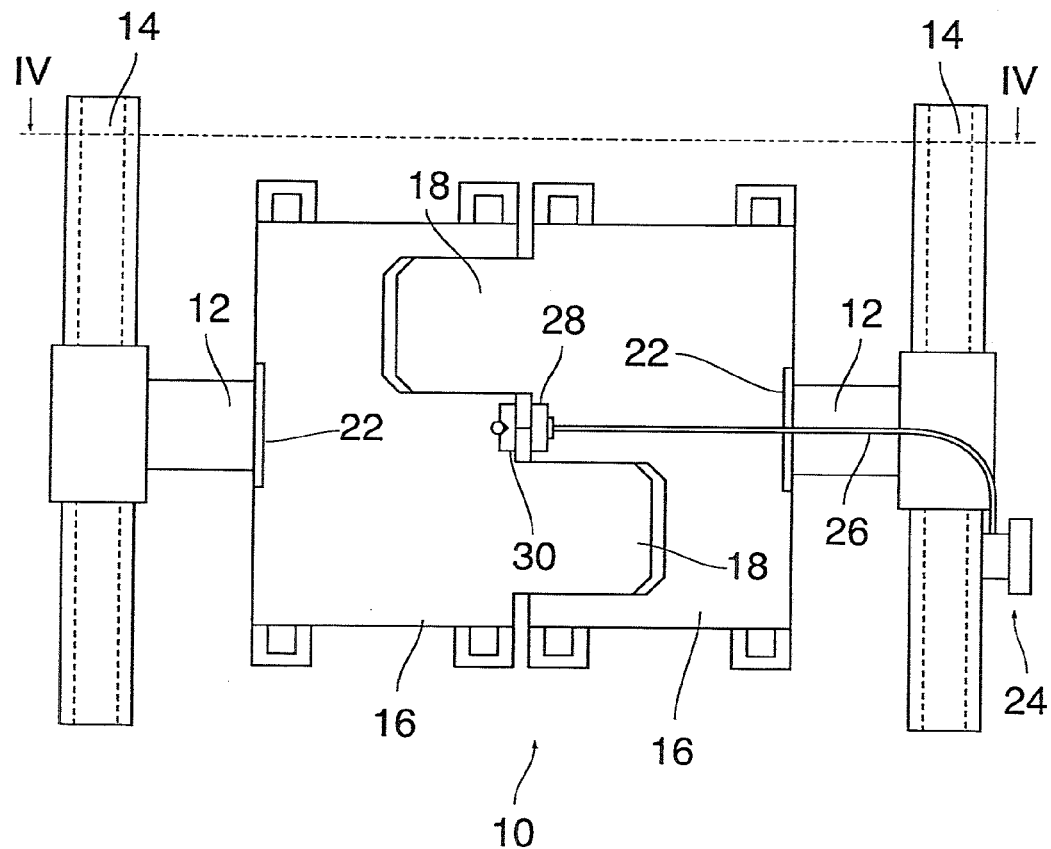
FIG. 3 is a view corresponding to FIG. 1, but for a different adjustment position of the lordosis support.
Figure 4:
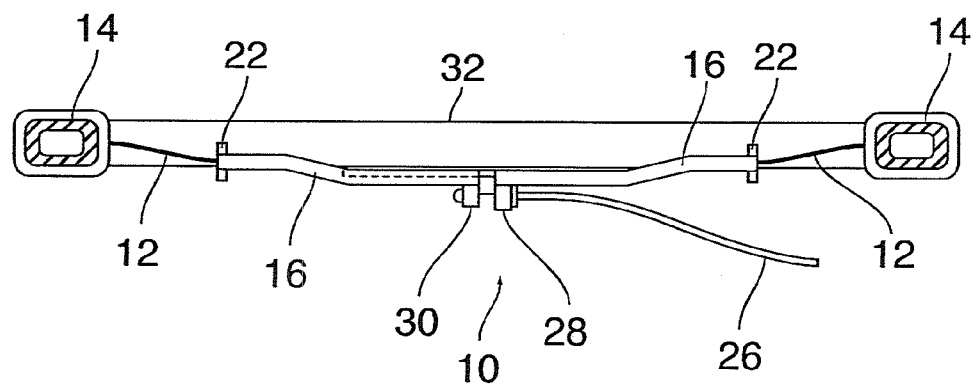
FIG. 4 is a section along the line IV-IV in FIG. 3.

When the user wishes to adjust the lordosis support so as to be "harder", she draws the two half-plates 16 closer together by means of the adjusting device 24 and the Bowden cable 26, as has been shown in FIGS. 3 and 4. This reduces the distance between the two points of attack 22, and the tension members 12 are subject to an additional tension force causing the support plate to be drawn closer to the plane defined by the frame legs 14.

Just for the purpose of comparison, FIGS. 2 and 4 also show a lower frame leg 32 of the seat back, which lower frame leg is shown as a reference for the position of the support plate 10 and thus facilitates to recognize the different positions of the support plate in FIGS. 2 and 4.

It is an advantage of the arrangement described herein that the relative movement between the two half-plates 16 of the support plate occurs in horizontal direction, i.e. in the direction in which also the Bowden cable 26 enters into the interior of the seat back. The force of the Bowden cable may therefore be transmitted directly to the half-plates 16 without any need for a deflection or change of the direction of action. The tension members 12 may simply be formed by short bands or, as the case may be, also by injection-molded plastic film hinges each of which has one end firmly connected to one half-plate 16 and the other end firmly anchored at the frame leg 14.

The construction is self-centering, i.e. the support plate is always in the central position between the two frame legs 14, regardless of the respective adjustment position of the Bowden cable 26. Moreover, the invention facilitates to arrange a support plate in the respectively desired height between the frame legs 14, and it is possible to provide means for height adjustment, if desired.

The two half-plates 16 of the support plate having practically identical shapes can effi-ciently be produced in the same injection molding die.

Commonly, the support plate 16 has the shape of a slightly curved basket that is con-cave on the side facing the user. In the embodiment that has been shown here, the width of the support plate is also varying in accordance with the distance between the points of attack 22. When the lordosis support is adjusted to be soft, as in FIG. 2, the support plate has a larger width. Nevertheless, the user is well-supported against lateral forces, because the entire structure formed by the support plate 10 and the tension members 12 forms a deep recess for the back of the user in this condition. When, in contrast, the lordosis support is adjusted to be hard, as in FIG. 4, the two half-plates move closer together, and the relief of the support plate becomes narrow, so that good lateral support for the spine of the user can still be obtained, although the lordosis support does not form such a deep recess in this condition.

Figure 5:
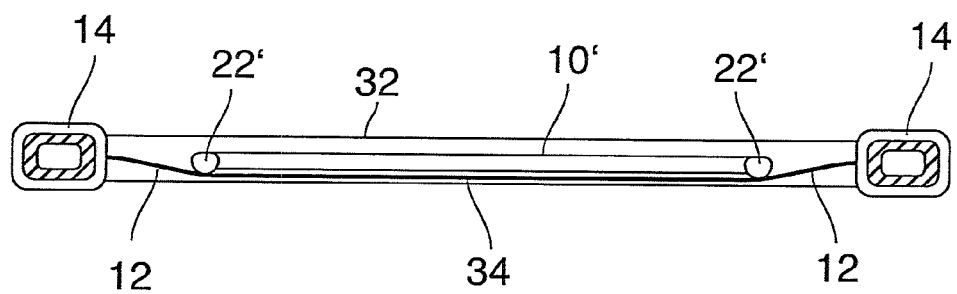
FIGS. 5 and 6 are sketches of a lordosis support according to another embodiment in two different adjustment positions.
Figure 6:
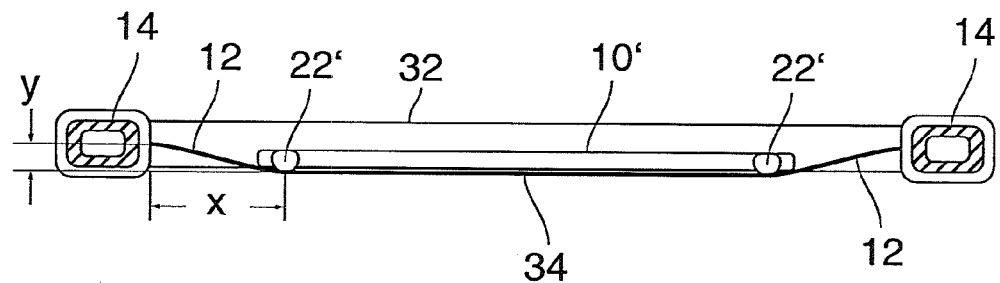

Instead of composing the support plate 10 of two parts, it is also possible in another embodiment just to provide adjustable points of attack at a one-piece support plate. An example of this variant has been shown in FIGS. 5 and 6. There, the tension members 12 are formed by a continuous cable 34 that has a constant length and extends from one frame leg 14 to the other. As the case may be, a plurality of such cables 34 may be provided in different heights. A one-piece support plate 10 is supported at the cable 34 with its left and right lateral edges and thus causes a trapezoid-shaped deflection of the cable. Points of attack 22' for the tension members 12 are in this case formed by ledges that extend in vertical direction, (normal to the plane of the drawing in FIG. 5) and form on the back side of the support plate, i.e. on the side facing the cable 34, a slightly elevated bulge at which the cable is deflected. The two points of attack 22' are displaceably guided in the support plate 10', so that the distance between them can be changed by means of an adjusting device which has not been shown here, the effect of the adjustment been visible by comparing FIGS. 5 and 6.

When the distance between the points of attack 22 is reduced, this causes the length of the tension members 12 to be increased because the total length of the cable 34 is constant. On the left side in FIG. 6, two stretches x and y have been drawn which form a right-angled triangle with the tension member 12. When the length of this tension member is designated as z, it follows from the theorem of Pythagoras:

$$y^2 = z^2 - x^2.$$

When, now, the points of attack 22' are displaced inwardly by a distance d, the quantity x has to be replaced by x+d. The central part of the cable 34 between the points of attack 22 is shortened by 2d, and this is compensated by the length of each tension member being increased by d. Consequently, z has to be replaced by z+d, and the result is:

$$y^2 = (z+d)^2 - (x+d)^2 = z^2 - x^2 + 2d(z-x).$$

As z is larger than x, this means that $y^2$ increases in proportion to d. Consequently, y increases in proportion to the square root of d. As y designates the distance between the plane of the frame legs 14 and the plane of the support plate 10', this means that the support plate 10' moves farther away from the plane of the frame legs, i.e. the lordosis support becomes more compliant.

The invention claimed is:

1. A lordosis support for a seat back rest, comprising:
   a support plate,
   tension members for holding the support plate between two frame legs of the seat back rest,
   the support plate having on each side at least one point of attack for a respective said tension member, and
   an adjusting device for adjusting a tension force of the tension members by changing the distance between the two points of attack,
   wherein the distance between the two points of attack is adjustable and the adjusting device is configured to change this distance,
   wherein the support plate has two half-plates that are displaceable relative to one another, and one point of attack is provided on each of the half-plates,
   wherein the two half-plates have identical shapes, and
   wherein each of the two half-plates has at least one tongue that is linearly displaceably guided in a duct of the other half-plate for translational movement relative to the duct.

2. The lordosis support according to claim 1, wherein each of the tension members is firmly anchored at a respective said point of attack.

3. The lordosis support according to claim 1, wherein the adjusting device has a Bowden cable which passes to the support plate in the direction in which the half-plates are displaceable relative to one another, the Bowden cable having an outer cable supported at a counter bearing of one of the half-plates and an inner wire supported at a counter bearing of the other half-plate.

4. The lordosis support according to claim 3, wherein the inner wire and the outer cable of the Bowden cable are in engagement with the half-plates so as to draw these half-plates together when the inner wire is put under tension.

\* \* \* \* \*